Nov. 5, 1957 J. G. INGRES 2,811,864
CONTROL MECHANISM FOR AUTOMATIC TORQUE CONVERTERS
Filed June 7, 1954 3 Sheets-Sheet 1
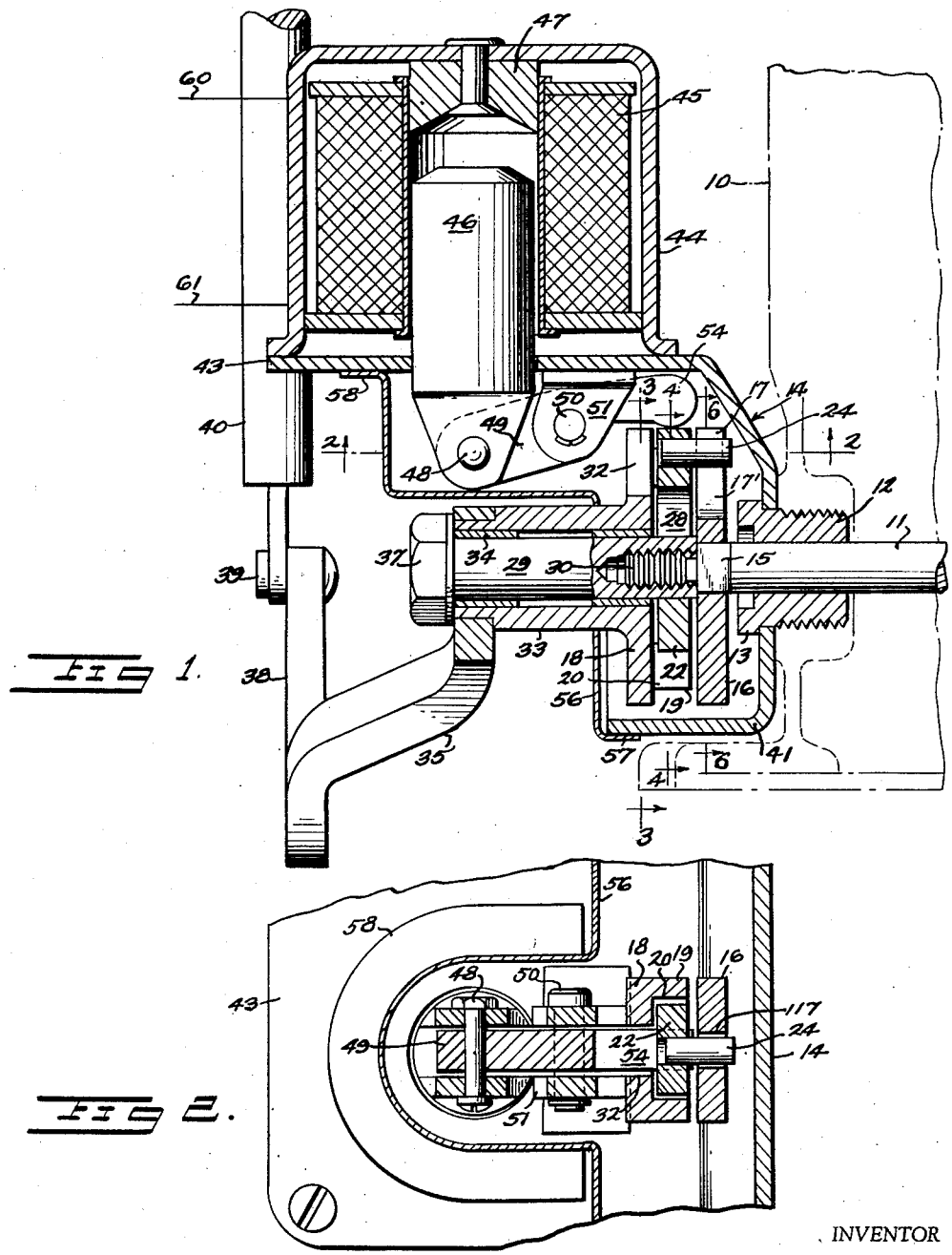
INVENTOR
JEANNOT G. INGRES
BY John F. Phillips
ATTORNEY

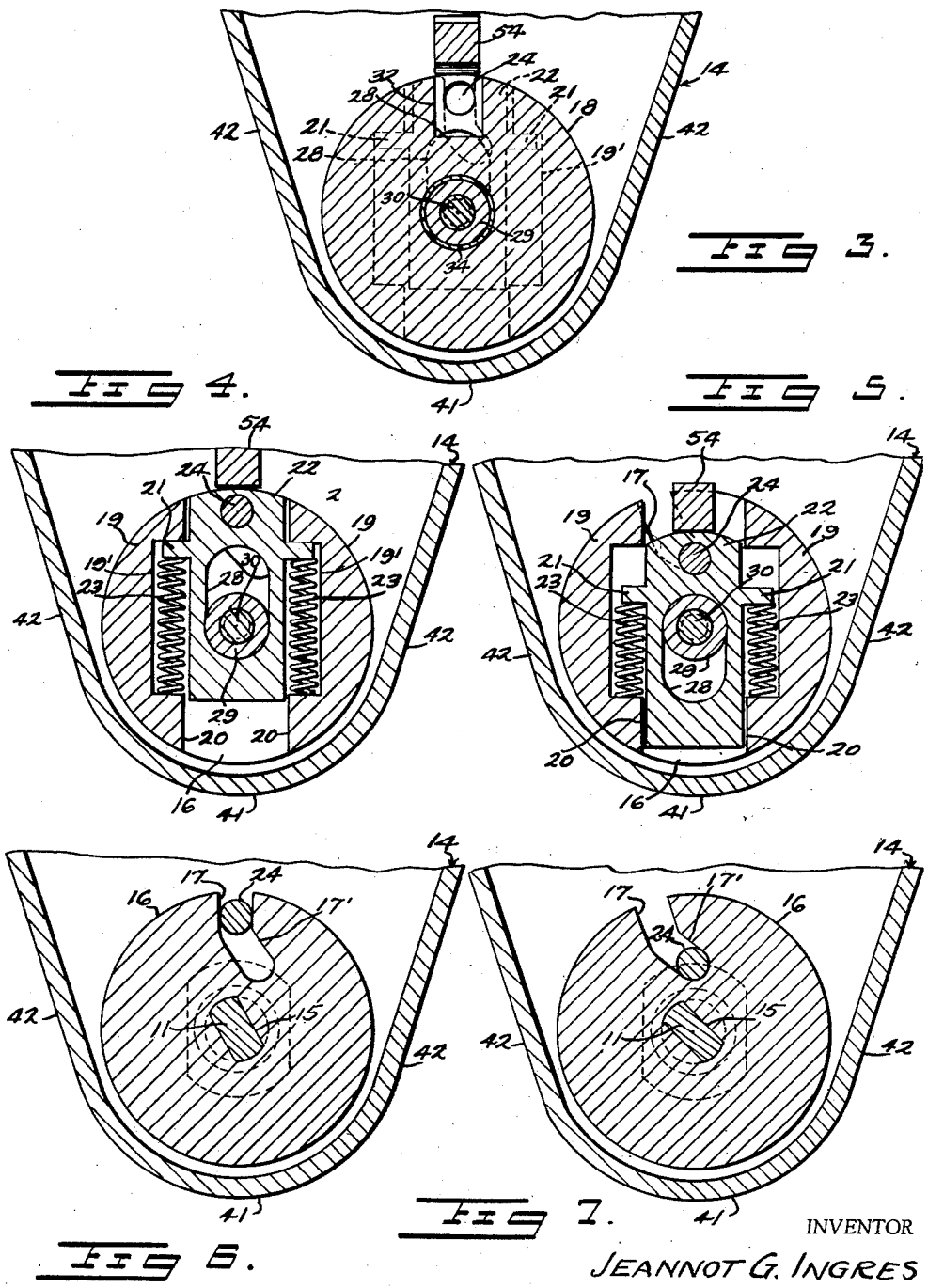

Nov. 5, 1957   J. G. INGRES   2,811,864
CONTROL MECHANISM FOR AUTOMATIC TORQUE CONVERTERS
Filed June 7, 1954   3 Sheets-Sheet 3
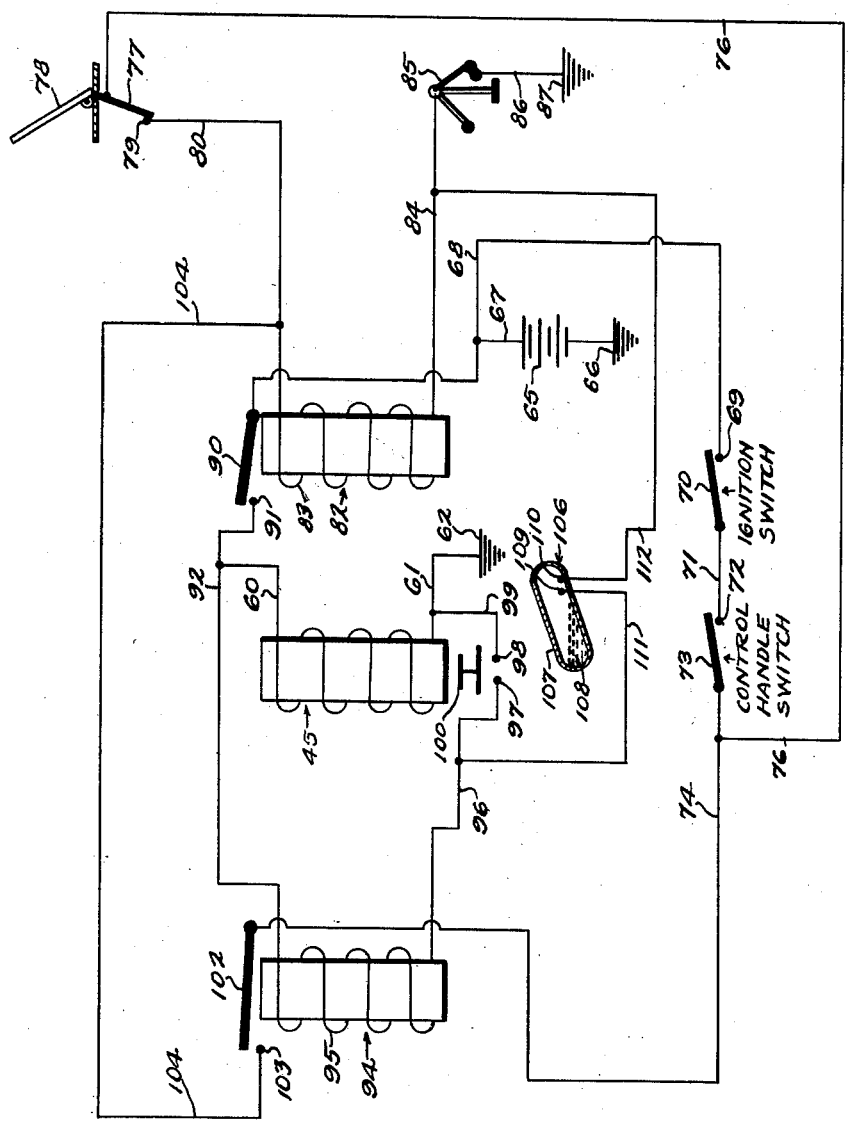
INVENTOR
JEANNOT G. INGRES
BY John V. Philips
ATTORNEY

United States Patent Office 2,811,864
Patented Nov. 5, 1957

2,811,864

CONTROL MECHANISM FOR AUTOMATIC TORQUE CONVERTERS

Jeannot G. Ingres, Dearborn, Mich., assignor to Automatic Shifters, Inc., Richmond, Va., a corporation of Virginia Application June 7, 1954, Serial No. 434,799

13 Claims. (Cl. 74—472)

This invention relates to a control mechanism for automatic torque converters and is an improvement over the mechanism shown in my copending application Serial No. 340,600, filed March 5, 1953.

As stated in the copending application referred to, certain types of automatic torque converters are in common use for automobiles and are controlled by a handle at the steering wheel. Such handle has associated therewith a pointer adapted to be moved selectively to any of the desired conventional positions, namely, parking, neutral, drive, low, or reverse. In some such automatic torque converters, the transmission ratio automatically changes from "low" to "driving" range as vehicle speed accelerates. In one such torque converter, no such driving ratio change takes place with the control pointer in the "D" or normal "drive" position. Where a higher transmission ratio is desired, it is necessary manually to move the pointer to the "L" or low position. My copending application referred to discloses a novel control mechanism for torque converters of the type last referred to, the construction providing means for automatically shifting back to a "low" driving condition under predetermined conditions of low vehicle speeds or low torque loads. The structure of the copending application is highly advantageous for a number of reasons. For example, the structure is not only simple and economical to manufacture but readily may be arranged externally of the torque converter casing, thus eliminating any necessity for making any changes within the transmission itself. It is further advantageous for the reason that when the control handle is in "driving" position and a shift is made to "low," the device acts automatically to lock the control handle to prevent its being manually moved until after the transmission is returned to normal "driving" condition.

An important object of the present invention is to provide a novel system for controlling automatic torque converters of the type referred to wherein, with the vehicle engine running and with the vehicle either stationary or moving forwardly below a predetermined speed, a "low" ratio is established in the transmission with the control handle locked in "drive" position, and wherein the shift to normal "driving" ratio automatically is established when the vehicle speed reaches a predetermined point, provided there are no unusual torque loads on the vehicle engine at the speed at which the shift into normal "driving" ratio would be established.

A further object is to provide such a system wherein two controls are provided for determining when the shift into "driving" ratio will take place from the "low" ratio, one of such means being controlled in accordance with vehicle speed and being operable at a predetermined vehicle speed, and the other control means overruling the first-mentioned means to prevent the shift into "driving" ratio from taking place if torque loads are above a predetermined point, until such torque loads relatively decrease.

A further object is to provide an apparatus of the character referred to wherein the means for effecting the shift from "low" to "driving" ratio at predetermined vehicle speeds is in the form of a governor, while the means for overrulling the governor under relatively heavy torque loads, for example when the vehicle is being rapidly accelerated, is in the form of an inertia switch which operates to close an auxiliary circuit independently of the governor when the vehicle is rapidly accelerated.

A further object is to provide an apparatus similar to that shown in the copending application referred to, wherein a single operating solenoid is energizable to effect the shift into the "low" range and wherein the governor normally breaks the circuit through such solenoid at a predetermined vehicle speed and under low torque conditions, and to provide in conjunction therewith an overrulling switch which prevents de-energization of the operating solenoid under heavy torque load conditions, for example when the vehicle is rapidly accelerated.

A further object is to provide a system of this character wherein the control governor, below a predetermined speed, closes a switch arranged in the circuit which also includes an accelerator pedal switch, closed when the engine is idling, so that whenever the vehicle engine is started with the transmission control handle in "driving" position, a shift will be made into the "low" transmission range, the shift into the "driving" range, after the accelerator switch is opened upon depression of the accelerator pedal, being controlled through the medium of holding circuits associated with the operating solenoid to render the governor effective for de-energizing the operating solenoid above a predetermined speed unless relatively heavy torque loads are placed on the engine, in which case the holding circuit is maintained closed by the inertia switch above the speed at which the operating solenoid ordinarily would be broken at a predetermined vehicle speed, until torque loads are reduced.

Other objects and advantages of the invention will become apparent during the course of the following description.

In the drawings I have shown one embodiment of the invention. In this showing:

Figure 1 is a horizontal sectional view through the operating mechanism associated with the torque converter, the casing of the latter being shown in broken lines and parts being shown in elevation;

Figure 2 is a vertical sectional view on line 2—2 of Figure 1;

Figure 3 is a detail sectional view on line 3—3 of Figure 1;

Figure 4 is a similar view on line 4—4 of Figure 1, showing the parts in normal position;

Figure 5 is a similar view showing the parts shifted to the low driving range;

Figure 6 is a section on line 6—6 of Figure 1, showing the parts in normal position;

Figure 7 is a similar view showing the parts shifted to the low driving range; and Figure 8 is a schematic view of the electrical system for controlling the mechanical parts of the apparatus.

Referring to Figure 1, numeral 10 generally designates a conventional torque converter now in common use in motor vehicles. The torque converter forms per se no part of the present invention and need not be illustrated in detail. The torque converter is provided with a control shaft 11 (Figures 1, 6 and 7), and this shaft is conventionally rocked by the usual control handle at the steering wheel of the vehicle (not shown) selectively to parking, neutral, low, driving and reverse positions. The present invention is concerned with the rocking of the shaft 11 between low and driving positions and, accordingly, only these two positions have been illustrated with respect to the moving parts of the mechanism.

The shaft 11 extends through a bearing nut 12 (Figure 1) which is similar to the conventional bearing nut for the shaft 11, except that it is longer, to provide a head 13 spaced from the casing of the torque converter to clamp thereagainst a support indicated as a whole by the numeral 14. This support will be referred to in detail later.

The shaft 11 is provided with a polygonal or flattened end 15 extending through a similarly shaped opening in a disk 16 (Figures 1, 6 and 7). In the top edge portion thereof, as viewed in Figure 1, the disk 16 is provided with a slot having a normally radial portion 17 and an angular portion 17', tangential to a circle substantially smaller than the diameter of the disk 16, as will be apparent. Since the disk 16 fits the flattened shaft end 15, it will be obvious that this disk and the shaft 11 rock as a unit.

A disk 18 is arranged coaxial with and spaced from the disk 16 as shown in Figure 1. The disk 18 carries preferably integral, diametrically extending portions 19 provided with spaced parallel faces 20 recessed as at 19' to receive outwardly projecting lugs 21 carried by a cross head 22. The lugs 21 are engaged by springs 23 to urge them to the normal positions shown in Figure 4. It will become apparent that such normal position is also shown in Figure 1. The cross head 22 carries a pin 24 projecting laterally therefrom, that is, parallel to the axis of the shaft 11, and the pin 24 is arranged in the slot in the disk 16 and normally is in the radial portion 17 thereof.

The cross head 22 is provided therethrough with a slot 28 elongated diametrically of the disks 16 and 18. In this slot is arranged a shaft 29 connected to the outer end of the shaft 11 by a threaded extension 30 thereon. The shafts 11 and 29, as will be apparent below, rock as a single unit for placing the torque converter in any of its selective conditions.

The disk 18 (Figures 1 and 3) is provided with a radial slot 32 which is arranged at the top of the disk 18 when the parts are in the "driving" position, and such positions of the parts are shown in Figures 1, 3 and 4. A hub 33 is preferably formed integral with the disk 18 and projects therefrom axially of the shaft 29 and is provided therein with bearings 34 supporting the shaft 29 for rocking movement relative to the hub 33. A crank 35 is connected to the hub 33 and may be welded thereto, and a nut 37 is threaded on the outer end of the shaft 29 as shown in Figure 1.

The crank 35 extends downwardly and forwardly with respect to the vehicle as at 38 (Figure 1) and is pivotally connected as at 39 to the rear end of a rod 40. This rod extends forwardly for mechanical connection (not shown) with the usual control handle adjacent the steering wheel.

The support 14 is provided with a bottom portion 41 curved beneath the disks 16 and 18 and associated elements as shown in Figures 3–7 inclusive, and the side portions of the lower part of the support diverge upwardly as at 42. These side portions of the support are integral with an upper shelf portion 43 (Figure 1) spaced above the axis of the shafts 11 and 29. The shelf portion 43 supports thereabove a casing 44 in which is arranged a solenoid 45 provided with an armature 46 limited in its movement in one direction by a stop 47 of non-magnetic material. The rear or lower end of the armature 46, as viewed in Figure 1, is pivotally connected as at 48 to a lever 49. This lever is pivoted intermediate its ends as at 50 to a bracket 51 carried by the shelf portion 43. The pivots 48 and 50 are provided with sufficient play with respect to the elements to which they are connected to permit the limited movement which will be imparted to the lever 49 upon energization of the solenoid 45.

The end 54 of the lever 49 opposite the pivot 48 has a rounded bottom edge as shown in Figure 1 engaging the top of the cross head 22 as shown in Figures 1, 4 and 5. Downward movement of the lever end 54 obviously will move the cross head 22 downwardly to the position shown in Figure 5, against the tension of the springs 23, when the lever 49 rocks in a clockwise direction about the pivot 50, from the position shown in Figure 1.

The lever end 54 is arranged in vertical alinement with the slot 32 (Figures 1 and 3) when the parts are in the normal positions shown in such figures. When the lever 49 is rocked in the manner referred to, to depress the cross head 22, the lever end 54 will move into the slot 32 to lock the disk 18 against rocking movement. It will be obvious that when the solenoid 45 is de-energized and the parts are in the positions shown in Figure 1, the disk 18 may be selectively moved by the manually operable mechanism to any of its positions.

A sheet metal cover plate 56 is preferably employed to protect the elements associated with the support 14. The cover plate 56 is provided with a flange 57 fitting the lower portion of the support 14, and is provided with an upper flange 58 seating against the bottom of the shelf portion 43 of the support. The cover plate 56 may be secured in position by any suitable means (not shown).

The solenoid 45 is provided with a pair of lead wires 60 and 61, further described below in connection with the diagrammatic showing in Figure 8 of the drawings. The electrical system is efficient for properly controlling the solenoid 45, when the control handle for the torque converter is in the driving position, to provide for starting the vehicle from a standstill in "low" and for automatically shifting to the "driving" condition under predetermined conditions of vehicle speed, or torque load conditions as further described below.

Referring to Figure 8, the numeral 65 designates the vehicle battery, grounded at one side as at 66. The positive side of the battery is tapped as at 67 into a wire 68 one end of which leads to a contact 69 engageable by a switch 70 associated with the ignition switch to be closed when such switch is closed. The switch 70 is connected by a wire 71 to a contact 72 engageable by a switch 73. This switch is connected to the transmission control handle, operable adjacent the steering wheel for selectively conditioning the torque converter. The switch 73 is closed only when the control handle is in "driving" position. The switch 73 is connected to one end of a wire 74.

The wire 76 has one end tapped into the wire 74 and has its other end connected to a switch 77 mechanically connected to the vehicle accelerator pedal 78 and engageable when the pedal is in idling position with a stationary contact 79 connected to one end of a wire 80.

A primary relay 82 is provided with a winding 83 one end of which is connected to the wire 80 and the other end of which is connected by a wire 84 to a governor switch 85 adapted to close a circuit through a wire 86 to ground 87 under certain conditions of vehicle speed. It will be apparent that in starting the vehicle from a standstill, the relay winding 83 can be energized only if the accelerator is in idling position and all of the switches 70, 73 and 85 are closed.

The relay 82 is provided with an armature 90 connected to the wire 68 and engageable with a stationary contact 91 when the relay 82 is energized. The contact 91 is connected to one end of a wire 92 into which the wire 60 of the winding of the solenoid 45 is connected. The other wire 61 of this solenoid is grounded as at 62.

A secondary relay 94 is provided with a winding 95 one end of which is connected to the wire 92 and the other end of which is connected by a wire 96 to a stationary contact 97 having a companion contact 98 connected as at 99 to the wire 61. The armature of the solenoid 45, of course, is the armature 46 shown in Figure 1. This armature is mechanically connected in any suitable manner (not shown) to a switch 100 engageable with both contacts 97 and 98 when the solenoid 45 is energized.

The secondary relay 94 is provided with an armature switch 102 engageable with a stationary contact 103 when the relay is energized, and a wire 104 connects the contact 103 to the wire 80.

The electrical system as so far described is fully operative, as further referred to below, for causing energization of the solenoid 45 to effect a transmission shift into "low" below a predetermined vehicle speed and to de-energize the solenoid 45 for a shift back into the driving range above a predetermined speed. However, it is desired to prevent this shift back into driving range under predetermined conditions of rapid vehicle acceleration and consequently heavy torque loads. In this connection, it is pointed out that the governor switch 85 is of the type which opens and closes at different speeds. For example, the governor switch may close at a vehicle speed of 14 M. P. H. and open at a vehicle speed of 20 M. P. H., thus providing a 6 M. P. H. range between the opening and closing of the switch to prevent "hunting" which would occur if the switch 85 opened and closed at approximately the same speed. Assuming that the vehicle is rapidly accelerated, it is not desirable to permit the shift into the driving range to occur at 20 M. P. H., and this shift is prevented by an auxiliary circuit associated with the system thus far described.

The auxiliary circuit comprises an inertia switch generally indicated by the numeral 106 and preferably comprising a closed elongated casing or tube 107 sloping downwardly toward the forward end of the vehicle and containing therewithin a body of mercury 108. A pair of contacts 109 and 110 within the rear end of the casing 107 are connected respectively to wires 111 and 112. The wire 111 is tapped into the wire 96 while the wire 112 is tapped into the wire 84. The body of mercury 108 normally occupies the position shown in Figure 8. When the vehicle speed is rapidly accelerated, the inertia of the mercury causes it to flow upwardly into the back end of the casing 107 to electrically connect contacts 109 and 110 for a purpose to be described.

*Operation*

Assuming that the vehicle is to be started from the standstill, the ignition switch will be closed, thus closing the switch 70, and the control handle for the torque converter will be placed in "drive" position, thus closing the switch 73. With the accelerator initially in idling position, a circuit will be closed from battery 65 through wires 67 and 68, switches 70 and 73, wire 76, switch 77, wire 80, solenoid winding 83, wire 84, and thence through the governor switch 85 and back to the battery through grounds 87 and 66. The vehicle being stationary, the governor switch obviously will be closed.

The closing of the circuit referred to energizes the primary relay 82, thus moving the armature switch 90 to closed position. A circuit then will be established from wire 68 through switch 90, wires 92 and 60, solenoid 45, and thence through wire 61 and grounds 62 and 66 back to the battery 65. The solenoid 45 thus will be energized.

Referring to Figures 1–7, inclusive, it will be apparent that the energization of the solenoid 45 moves the armature 46 to swing the lever 49 in a clockwise direction about its pivot 50. The lever end 54 moves into the slot 32 of the disk 18, thus locking this disk in the driving position which it will occupy when the control handle for the torque converter has been placed in a corresponding position as described above. The lever end 54, swinging downwardly as viewed in Figures 1, 4 and 5, will move the cross head 22 from the position shown in Figure 4 to the position shown in Figure 5, this action taking place against the tension of the springs 23. Whereas the pin 24 previously will have occupied a position in the radial portion of the slot 17 as in Figure 6, radially inward movement of the pin 24 will cause it to move into the angular portion 17′ of the slot, and this operation rocks the shaft 11 into "low" position.

The foregoing operation thus automatically establishes the "low" driving condition of the torque converter immediately upon the starting of the vehicle engine, if the control handle is in "driving" position to close the switch 73. It will be apparent that if the vehicle is now started forwardly by depressing the accelerator pedal 78, the switch 77 will immediately open to break the previously described circuit through the relay 82. However, the relay 94 and associated elements provide a holding circuit for the relay 82 and thus for the solenoid 45. With the armature switch 90 closed, as previously described, to energize the solenoid 45, a circuit also will be closed from wire 92 through winding 95, wire 96, across contacts 97 and 98 (the switch 100 being closed by energization of the solenoid 45), and thence through wires 99 and 61 and grounds 62 and 66 to the battery 65. The solenoid 94 thus being energized, the switch 102 will be closed and current will flow from the battery through wires 67 and 68, switches 70 and 73, wire 74, switch 102, wires 104 and 80, and thence through the relay winding 83 and back to the battery through the governor switch 85 as in the circuit first described. The breaking of the initial circuit at the accelerator switch 77, therefore, does not affect energization of the solenoid 45. The relay 94 retains the relay 82 energized to maintain the switch 90 closed, thus keeping closed the circuit through the operating solenoid 45.

Assuming that the vehicle is accelerated at what may be termed a normal rate, the body of mercury 108 will remain in the lower end of the switch casing 107. When a vehicle speed of, for example, 20 M. P. H. is reached, the governor switch 85 will open the circuit to ground 87, thus de-energizing the relay 82 and opening the switch 90. This action opens the circuit for both the solenoid 45 and relay 94, the switch 102 for the holding circuit thereby opening and the de-energization of the solenoid 45 opening the switch 100.

When the solenoid 45 is de-energized, the springs 23 will return the cross head 22 from the position shown in Figure 5 to the position shown in Figure 4. The pin 24 will then move outwardly through the angular slot portion 17′ and into the radial slot portion 17 to restore the disk 16 to the position shown in Figure 6. This operation rocks the disk 16 in a clockwise direction to restore the shaft 11 to "driving" position. The lever end 54 moves out of the slot 32 to the position shown in Figures 1 and 3, and the lever 49 thereupon becomes inoperative. The shift accordingly is made into the "driving" position of the shaft 11 and the disk 18 is free to be turned manually by the control handle at the steering wheel. Such operation of the disk 18 will bodily rock the cross head 22 to turn the pin 24 about the axis of the shaft 11 to place it later in any desired position. It will be apparent, however, that when the automatic shift is made into "low" the disk 18 is locked against manual movement and the shift takes place by movement of the cross head 22 diametrically of the shaft 11 as described above.

As previously stated, the governor 85 preferably is of the type which opens at a speed higher than its closing speed. Such governors are commercially available and form per se no part of the present invention. Assuming that the vehicle, with the transmission now in driving range, is decelerated, the governor switch 85 will close at, for example, 14 M. P. H. If the accelerator pedal 78 is not released for movement to idling position, however, the switch 77 will not close and no circuit will be established through the relay 82. Susequent acceleration of the vehicle will take place with the transmission in "driving" range, as is desirable. If the accelerator pedal is fully released to close the switch 77 under such conditions, however, the circuit for the relay 82 again will be closed since vehicle speed will be below the closing speed of the governor 85, and the operation previously referred to again will take place.

If the vehicle is started from a standstill in the manner previously described and the shift is made into "low" range, a different operation will result if the vehicle is accelerated above a predetermined rate, under which conditions a heavy torque load will be placed on the vehicle engine and it is desired not to effect the automatic shift into "driving" range at the vehicle speed at which the governor switch 85 opens. Assuming that the shift has been made into the low range, in the manner described, when the vehicle is started from a standstill and rapid vehicle acceleration takes place, the circuit through the governor switch 85 will be broken, as previously described, when a vehicle speed of 20 M. P. H. is reached. Under conditions of rapid vehicle acceleration, however, the body of mercury 108 will have flowed rearwardly uphill in the casing 107 to close a circuit across the contacts 109 and 110. Under such conditions the previously described circuit from the solenoid winding 83 through wire 84 will be broken at the governor switch 85, but current will flow through wire 112, across contacts 109 and 110, through wires 111 and 96, across contacts 97 and 98, and thence back to the battery through wires 99 and 61, and grounds 62 and 66. Thus the circuit for the relay 82 will remain closed regardless of the opening of the governor switch 85 and the armature 90 will maintain closed the circuits through solenoid 45 and relay 94 and the transmission will remain in "low" range.

When the vehicle speed has accelerated to the point where the torque load on the vehicle engine decreases and the weight of the body of mercury 108 overcomes the previously utilized inertia forces which closed a circuit across contacts 109 and 110, the body of mercury will flow downwardly and forwardly to open the auxiliary circuit through the mercury switch. Both the switches 85 and 106 now will be opened to break the circuit through the relay 82, which results in effecting the shift into "driving" range in the manner previously described.

It is advantageous to connect the mercury switch in the circuit independently of the ground 87 for the governor switch 85. By connecting the mercury switch at some other point, for example in the wire 96, the closing of a circuit through the mercury switch is dependent upon energization of the solenoid 45. Therefore, it is impossible for the mercury switch to be operative for maintaining closed the circuits for the solenoid 45 and the two relays, except when these elements previously have been energized in accordance with operation of the governor switch 85.

From the foregoing, it will be apparent that the present system provides novel means whereby, upon the placing in forward motion of a vehicle equipped with the type of torque converter referred to, and with the control handle in "driving" position, the "low" range of the transmission automatically will be established until a given vehicle speed is reached or until the torque load on the vehicle engine decreases. It also will be apparent that there will be no automatic shift back into "low" after the "driving" range has been established, unless the accelerator pedal is fully released and vehicle speed drops below a predetermined point. If driving conditions are such that the "low" range is desired at the low vehicle speeds in which the governor switch 85 will be closed, the operator, without moving the control handle for the torque converter, may automatically establish the "low" driving range merely by momentarily releasing the accelerator. When the accelerator is thereafter depressed, the vehicle torque converter will be in "low" until the solenoid 45 is again de-energized either by the opening of the governor switch 85 or the inertia switch 106. The apparatus accordingly provides novel means operable under most conditions for providing the desired driving range and avoiding an unnecessary and annoying constant shift back and forth between "driving" and "low" ranges.

It also will be apparent that the transmission is subject to manual control exactly in accordance with conventional practice except where it is desired to take the control away from the operator, namely when the shift has been made into "low" when the transmission control handle is in "driving" position. Obviously, it would be undesirable and dangerous under such conditions to permit a manual shift to be made, and such shift is prevented by the locking of the disk 18.

All parts of the present mechanism and system are arranged externally of the transmission housing and require no changes whatever in the parts of the transmission. The system readily may be attached as an accessory to existing motor vehicles having torque converters of the type referred to.

It is to be understood that the form of the invention shown and described is to be taken as the preferred example of the same and that the scope of the invention is defined in the appended claims.

I claim:

1. A control mechanism for a vehicle torque converter having a rock shaft for controlling the condition of the converter and movable to a plurality of positions two of which are a low range position and a driving range position, comprising manual means for rocking said shaft to any of its positions, a power device energizable for rocking said shaft from driving range position to low range position, a pair of means for controlling energization of said power device, one means of said pair being operable only when said manual means is in a position to place said shaft in driving range position and the other of said means comprising a governor operative below a predetermined vehicle speed for causing energization of said power device and operative above said predetermined vehicle speed for de-energizing said power device, and means responsive directly to the rate of acceleration of the vehicle for overruling said governor to maintain said power device energized above said predetermined speed.

2. A control mechanism for a vehicle torque converter having a rock shaft for controlling the condition of the converter and movable to a plurality of positions two of which are a low range position and a driving range position, comprising an actuating device having connection with said shaft to rock it, manual means for operating said actuating device to rock said shaft, a power device for operating said actuating device independently of said manual means to rock said shaft from driving range to low range position, governor means operative under predetermined conditions including a maximum vehicle speed for energizing said power device and for de-energizing said power device above said maximum speed, and means responsive directly to the rate of acceleration of the vehicle for overruling said governor means to maintain said power device energized above said maximum speed.

3. A control mechanism for a vehicle torque converter having a rock shaft for controlling the condition of the converter and movable to a plurality of positions two of which are a low range position and a driving range position, comprising an actuating device having connection with said shaft to rock it, manual means for operating said actuating device to rock said shaft, a solenoid energizable for operating said actuating device independently of said manual means to rock said shaft from driving range to low range position, and circuit means for controlling energization of said solenoid, said circuit means comprising a governor operative under predetermined conditions and below a predetermined vehicle speed for energizing said solenoid and for de-energizing said solenoid above said predetermined vehicle speed, said circuit means further comprising means directly dependent upon a predetermined rate of acceleration of the vehicle speed for overruling said governor to maintain said solenoid energized above said predetermined vehicle speed.

4. A control mechanism for a vehicle torque converter having a rock shaft for controlling the condition of the converter and movable to a plurality of positions two of which are a low range position and a driving range position, comprising an actuating device having connection with said shaft to rock it, manual means for operating said actuating device to rock said shaft, a solenoid energizable for operating said actuating device independently of said manual means to rock said shaft from driving range to low range position, and circuit means for controlling energization of said solenoid, said circuit means comprising a governor operative under predetermined conditions and below a predetermined vehicle speed for energizing said solenoid and for de-energizing said solenoid above said predetermined vehicle speed, said circuit means further comprising an auxiliary circuit, and an inertia switch in said auxiliary circuit adapted to close under relatively rapid vehicle accelerating conditions to overrule said governor above said predetermined vehicle speed to maintain said solenoid energized.

5. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a power device for rocking said shaft from said driving range to said low range position, a plurality of interdependent control devices for said power device, one of said control devices being operative when the accelerator pedal is in idling position, another being operative when said manual means occupies a position normally placing said shaft in driving range position and another being a governor operative below a predetermined speed whereby said power device will be operative when all of said control devices are operative, supplemental means for maintaining said power device operative upon movement of the accelerator pedal from idling position, said supplemental means being subject to control by said governor to maintain said power device operative below a predetermined vehicle speed above which said governor renders said supplemental means inoperative for maintaining energization of said power device, and means responsive directly to the rate of acceleration of the vehicle above said predetermined vehicle speed for overruling said governor and maintaining the operativeness of said supplemental means to maintain energization of said power device.

6. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from said driving range to said low range position independently of said manual means, and circuit means for said solenoid comprising a plurality of switches all of which must be closed to effect energization of said solenoid, one of said switches being closed when the accelerator pedal is in idling position, and another of said switches being closed when said manual means is in a position to normally place said rock shaft in driving range position, a vehicle speed governor, the other of said plurality of switches being closed by said governor below a predetermined vehicle speed, a holding circuit means for said solenoid for maintaining said solenoid energized when the accelerator pedal is moved from idling position, until said governor opens the switch associated therewith above said predetermined vehicle speed, and an inertia switch connected in said holding circuit for maintaining the latter closed when vehicle speed is accelerated above a predetermined rate and said other switch is opened by said governor.

7. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from said driving range to said low range position independently of said manual means, and circuit means for said solenoid comprising a plurality of switches all of which must be closed to effect energization of said solenoid, one of said switches being closed when the accelerator pedal is in idling position, and another of said switches being closed when said manual means is in a position to normally place said rock shaft in driving range position, a vehicle speed governor, the other of said plurality of switches being closed by said governor below a predetermined vehicle speed, a holding circuit means for said solenoid for maintaining said solenoid energized when the accelerator pedal is moved from idling position, until said governor opens the switch associated therewith above said predetermined vehicle speed, and supplemental means connected in said holding circuit means and responsive directly to the rate of acceleration of the vehicle for overruling said governor above said predetermined vehicle speed to maintain said holding circuit means closed under predetermined relatively heavy torque loads on the torque converter.

8. A control mechanism according to claim 7 wherein said supplemental means comprises a normally open inertia switch including a pair of contacts, and means for closing a circuit across said contacts when the vehicle is accelerated at a relatively rapid rate.

9. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from driving range position to low range position, a first circuit comprising a plurality of switches all of which must be closed to energize such circuit, one of said switches being closed when said manual means is in a position to place said rock shaft in said driving range position, another of said switches being closed when the accelerator pedal is in idling position, a governor responsive to vehicle speed, the other of said switches being closed by said governor below a predetermined vehicle speed, a relay in said first circuit, a second circuit including said solenoid, a control switch in said second circuit closed by energization of said relay, a holding circuit for said relay energized upon the closing of said control switch for maintaining said relay energized when the accelerator pedal is moved from idling position until said governor opens the switch associated therewith, and an inertia switch in said holding circuit controlled by said governor, said inertia switch having a pair of normally disconnected contacts adapted to be connected to maintain said holding circuit energized independently of the governor-controlled switch when the vehicle is accelerated above a predetermined rate.

10. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from driving range position to low range position, a first circuit comprising a plurality of switches all of which must be closed to energize such circuit, one of said switches being closed when said manual means is in a position to place said rock shaft in said driving range position, another of said switches being closed when the accelerator pedal is in idling position, a governor responsive to vehicle speed, the other of said switches being closed by said governor below a predetermined vehicle speed, a relay in said first circuit, a second circuit including said solenoid, a control switch in said second circuit closed by energization of said relay, a holding circuit for said relay including said control switch and the switch associated with said governor but not including said accelerator pedal switch whereby, when the accelerator pedal is moved from idling position, said relay will remain energized until de-energized by operation of said governor, and an inertia switch connected in said holding circuit for maintaining the latter closed when vehicle speed is accelerated above a predetermined rate and said other switch is opened by said governor.

11. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from driving range position to low range position, a first circuit comprising a plurality of switches all of which must be closed to energize such circuit, one of said switches being closed when said manual means is in a position to place said rock shaft in said driving range position, another of said switches being closed when the accelerator pedal is in idling position, a governor responsive to vehicle speed, the other of said switches being closed by said governor below a predetermined vehicle speed, a relay in said first circuit, a second circuit including said solenoid, a control switch in said second circuit closed by energization of said relay, a holding circuit for said relay including an auxiliary switch closed by said solenoid upon energization thereof, one side of said switch being grounded, and a supplemental line connected between the other side of said auxiliary switch and said first circuit between said relay and said governor-controlled switch, said supplemental line having therein an inertia-controlled switch which is closed when the vehicle speed is accelerated above a predetermined rate to overrule said governor-controlled switch.

12. A control mechanism for a motor vehicle having an accelerator pedal and a torque converter provided with a rock shaft for controlling the condition of the converter and movable to a plurality of positions two of which are a low range position and a driving range position, comprising manual means for rocking said shaft to any of its positions, a solenoid energizable for rocking said shaft from driving range position to low range position, a first circuit comprising a plurality of switches all of which must be closed to energize such circuit, one of said switches being closed when said manual means is in a position to place said rock shaft in said driving range position, another of said switches being closed when the accelerator pedal is in idling position, a governor responsive to vehicle speed, the other of said switches being closed by said governor below a predetermined vehicle speed, a relay in said first circuit, a second circuit including said solenoid, a control switch in said second circuit closed by energization of said relay, a holding circuit for said relay including said control switch and the switch associated with said governor but not including said accelerator pedal switch whereby, when the accelerator pedal is moved from idling position, said relay will remain energized until de-energized by operation of said governor, and an inertia switch connected in said holding circuit and adapted to be closed only when said holding circuit is energized and the vehicle speed is accelerated above a predetermined point, whereby said holding circuit is maintained energized above the vehicle speed at which the governor controlled switch opens when the vehicle speed is accelerated above said predetermined speed.

13. A mechanism according to claim 12 wherein said inertia switch comprises an elongated casing sloping upwardly and rearwardly relative to the vehicle and provided with a body of mercury therein, said inertia switch having a pair of contacts adjacent the rear end thereof adapted to be connected by said body of mercury when the latter is moved rearwardly incident to vehicle acceleration above a predetermined rate.

References Cited in the file of this patent

UNITED STATES PATENTS 2,568,958     Hey _____ Sept. 25, 1951